US010328792B2

(12) United States Patent
Lee et al.

(10) Patent No.: US 10,328,792 B2
(45) Date of Patent: Jun. 25, 2019

(54) LID DEVICE

(71) Applicant: NIFCO INC., Yokosuka-shi, Kanagawa (JP)

(72) Inventors: Young-gook Lee, Yokosuka (JP); Junpei Horikawa, Yokosuka (JP)

(73) Assignee: NIFCO INC., Kanagawa (JP)

( * ) Notice: Subject to any disclaimer, the term of this patent is extended or adjusted under 35 U.S.C. 154(b) by 0 days.

(21) Appl. No.: 15/825,623

(22) Filed: Nov. 29, 2017

(65) Prior Publication Data

US 2018/0079297 A1     Mar. 22, 2018

Related U.S. Application Data

(63) Continuation of application No. 15/038,790, filed as application No. PCT/JP2014/005951 on Nov. 27, 2014, now Pat. No. 9,862,265.

(30) Foreign Application Priority Data

Dec. 2, 2013    (JP) ................................ 2013-249240

(51) Int. Cl.
*B60K 15/05*       (2006.01)
*F16H 19/04*       (2006.01)

(52) U.S. Cl.
CPC ........ B60K 15/05 (2013.01); *B60K 2015/053* (2013.01); *B60K 2015/0507* (2013.01);
(Continued)

(58) Field of Classification Search
CPC .. B60K 15/05; B60K 15/053; B60K 15/0515; B60K 15/0546; B60K 15/0561; B60K 15/0576; B60K 15/0584
(Continued)

(56) References Cited

U.S. PATENT DOCUMENTS 4,889,371 A * 12/1989 Girard ..................... E05B 81/20
                                                         292/201
2002/0089187 A1     7/2002   Holloway et al.
(Continued)

FOREIGN PATENT DOCUMENTS

CN         202658979 U     1/2013
DE     102008057860 A1    7/2010
(Continued)

OTHER PUBLICATIONS

International Search Report of International Application No. PCT/JP2014/005951, dated Jan. 13, 2015, 3 pages.
(Continued)

*Primary Examiner* — Dennis H Pedder
(74) *Attorney, Agent, or Firm* — Armstrong Teasdale LLP

(57) ABSTRACT

Provided is a lid device, which is compact and can be installed in an efficient manner. The lid device (20) releasably locks a lid (10) provided with a hinge (12) in a closed position. The lid device is provided with a push lifter (32) that alternates between an extended state and a retracted state each time the lid is pushed, a motor (46) placed next to the push lifter, a lock member (18) and a transmission mechanism (64) for transmitting the output of the motor. The lock member and the transmission mechanism are positioned between the push lifter and a side profile of the drive unit remote from the push lifter, and the lock member is moveable in a direction substantially perpendicular to a lengthwise direction of the push lifter and a direction from the push lifter toward the drive unit.

3 Claims, 8 Drawing Sheets

(52) U.S. Cl.
CPC ............... *B60K 2015/0538* (2013.01); *B60K 2015/0576* (2013.01); *F16H 19/04* (2013.01)

(58) Field of Classification Search
USPC ...................................................... 296/97.22
See application file for complete search history.

(56) References Cited

U.S. PATENT DOCUMENTS

| | | |
|---|---|---|
| 2012/0047807 A1 | 3/2012 | Lee et al. |
| 2013/0015670 A1 | 1/2013 | Perkins |
| 2013/0134737 A1 | 5/2013 | Ogata et al. |

FOREIGN PATENT DOCUMENTS

| | | |
|---|---|---|
| JP | S5591323 U | 6/1980 |
| JP | 2002240579 A | 8/2002 |
| JP | 2008303636 A | 12/2008 |
| JP | 2010006117 A | 1/2010 |
| JP | 2011140841 A | 7/2011 |
| JP | 2011522980 A | 8/2011 |
| JP | 2011256528 A | 12/2011 |
| JP | 2012077508 A | 4/2012 |
| KR | 101245173 B1 | 3/2013 |
| WO | 2011147593 A1 | 12/2011 |
| WO | 2013130495 A1 | 9/2013 |

OTHER PUBLICATIONS

Extended European Search Report for Application No. 14868280.0, dated Jul. 7, 2017, 6 pages.
Japanese Office Action issued in Japanese Application No. 2017-118688, dated Apr. 10, 2018.

\* cited by examiner

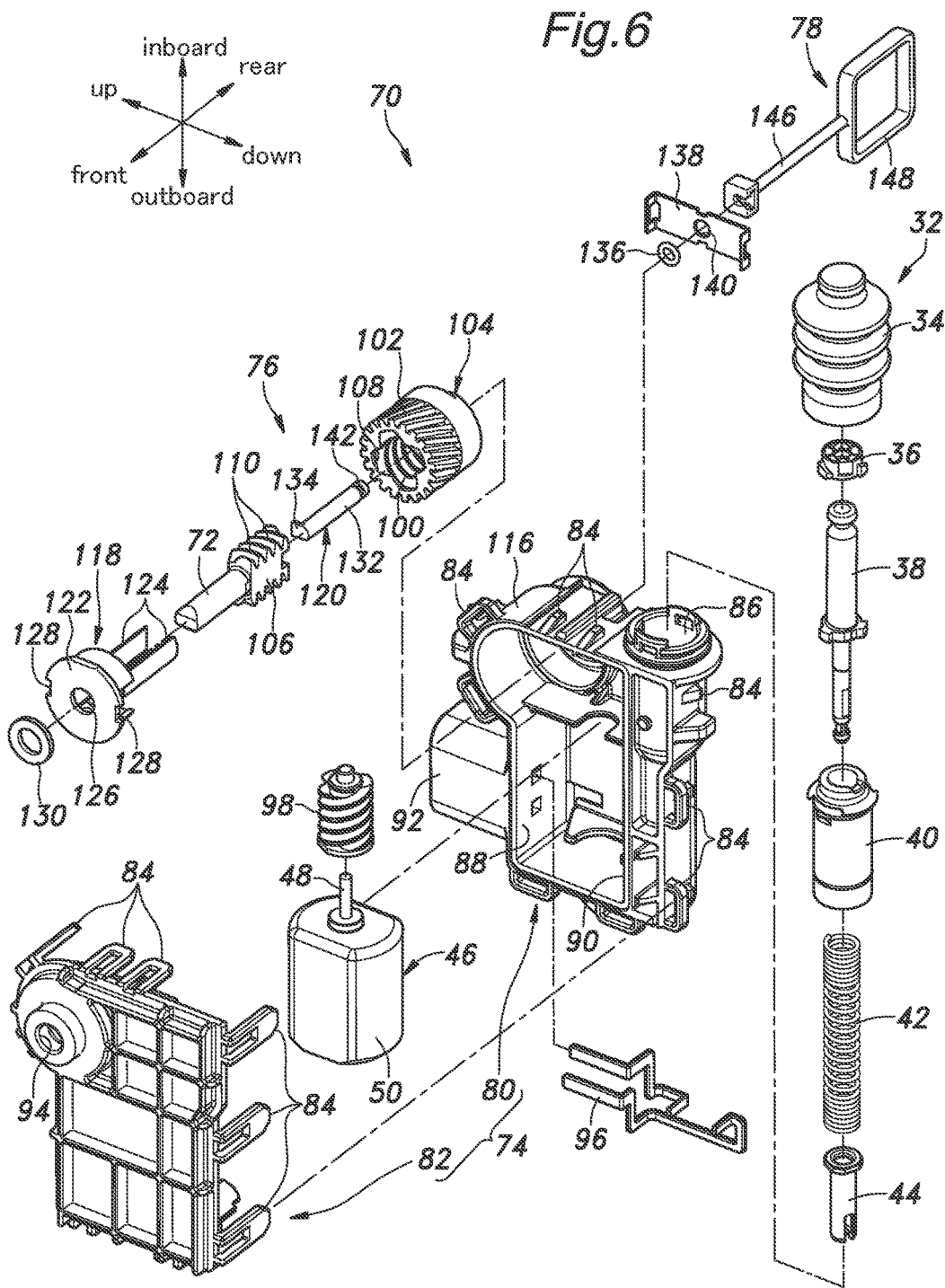

LID DEVICE

This application is a continuation application of U.S. patent application Ser. No. 15/038,790 entitled LID DEVICE, filed May 24, 2016, the disclosure of which is fully incorporated herein by reference. U.S. patent application Ser. No. 15/038,790 claims priority benefit of International Application Serial No. PCT/JP2014/005951 filed on Nov. 27, 2014. International Application Serial No. PCT/JP2014/005951 claims priority benefit to Japanese Patent Application No. 2013-249240 filed Dec. 2, 2013.

TECHNICAL FIELD

The present invention relates to a lid device having a function to releasably lock a hinged lid in a closed position and a function to push out the lid from the closed position to a ready-to-open position, and in particular to a fuel lid device that can releasably lock a fuel lid, for selectively exposing a fuel filler opening provided on a vehicle body, in a closed position.

BACKGROUND OF THE INVENTION

A fuel lid (fuel door) is hinged to a vehicle body, and when closed, conceals the fuel filler opening and conforms to the outer profile of the vehicle body. The fuel filler opening is normally closed by a fuel cap. The fuel lid may be locked in order to avoid the fuel lid from opening inadvertently.

For instance, in a certain type of fuel lid device, the fuel lid is automatically locked when closed, and a lever provided in the cockpit of the vehicle enables the driver to release the lock and pop open the fuel lid by pulling the lever. In addition to the types of fuel lid devices that can releasably lock the fuel lid, the lid devices that can be opened and closed by pushing the lid toward the vehicle body are also known. Such fuel lids are known to be convenient for motorists who use self-service gas stations. One such example is disclosed in Patent Document 1. The disclosed device is provided with a push lifter for opening and closing the fuel lid by alternately taking the retracted position and the extended position each time the fuel lid is pushed. Additionally, an electric motor is provided such that the motor shaft extends perpendicularly to the lengthwise direction of the push lifter. The motor shaft is coaxially provided with a screw which threads into a plunger coaxially disposed with the motor shaft so that the rotation of the electric motor causes the plunger to be moved in the axial direction away from the electric motor until the free end of the plunger is received in a lock hole of the fuel lid to lock the fuel lid. When the rotation of the motor is reversed, the plunger moves in the axial direction toward the motor until the free end of the plunger is disengaged from the lock hole of the fuel lid, and the lock of the fuel lid is released.

PRIOR ART DOCUMENT(S)

Patent Document(s)

Patent Document 1: DE102008057860A

SUMMARY OF THE INVENTION

Task to be Accomplished by the Invention

According to the lid device proposed in Patent Document 1, the motor and the plunger are disposed in a coaxial relationship. Therefore, a significant space is required, and the freedom in laying out the component parts is restricted. Also, a complex assembly work is required.

The present invention was made in view of such problems of the prior art, and has a primary object to provide a highly compact lid device.

Means to Accomplish the Task

To achieve such an object, a certain aspect of the present invention provides a lid device (20, 70) for pushing out a hinged lid (10) from a closed position to an open ready position, and for releasably locking the lid in the closed position, comprising: a push lifter (32) that alternates between an extended state for pushing the lid to the open ready position and a retracted state for permitting the lid to be placed in the closed position each time a free end of the push lifter is pushed by the lid; a drive unit (46) positioned near the push lifter; a lock member (18, 72) moveable between an engage position for engaging the lid in the closed position and a release position for releasing the lid; and a transmission mechanism (64, 76) for transmitting a drive force of the drive unit to the lock member to move the lock member between the engage position and the release position; wherein the lock member and the transmission mechanism are positioned between the push lifter and a side profile of the drive unit remote from the push lifter, and wherein the lock member is moveable in a direction substantially perpendicular to a lengthwise direction of the push lifter and a direction from the push lifter toward the drive unit.

According to this arrangement, the dimension of the lid device in the direction of the motion of the lock member can be reduced. Thereby, the lid device can be formed as a compact unit which can be efficiently installed. Also, the freedom in laying out the remaining component parts can be enhanced.

According to another aspect of the lid device (20) of the present invention, the drive unit includes an electric motor (46) having a motor shaft (48) extending in the lengthwise direction of the drive unit, and the transmission mechanism (64) includes a pinion (56) driven by the electric motor and a rack (58) fixedly attached to the lock member (18) and configured to reciprocate in a direction perpendicular to the lengthwise direction of the push lifter by meshing with the pinion.

The lock member can be moved between the engage position and the release position with a highly simple structure.

According to yet another aspect of the present invention, the transmission mechanism includes a speed reduction gear group consisting of a drive gear (52) coaxially attached to the motor shaft, a driven gear (54) disposed between the motor shaft and the push lifter and meshing with the drive gear, the driven gear having a larger number of teeth than the drive gear, and a pinion coaxially attached to the driven gear and having a smaller number of teeth than the driven gear.

According to this arrangement, the rotational speed of the motor can be reduced to a sufficient extent without preventing the compact design of the lid device.

According to yet another aspect of the present invention, the rack is provided with rack teeth (62) provided in a slot (6) as internal teeth, and the pinion projects into the slot.

According to this arrangement, the structure for slidably supporting the rack can be simplified, and the size of the lid device can be minimized.

According to yet another aspect of the present invention, the drive unit includes an electric motor (46) having a motor shaft (48) extending in the lengthwise direction of the drive unit, and the transmission mechanism (76) includes a worm (98) coaxially attached to the motor shaft, a worm wheel (104) having internal teeth (100) and external teeth (102) meshing with the pinion and a rack (106) fixedly attached to the lock member and configured to reciprocate in a direction perpendicular to the lengthwise direction of the push lifter by meshing with the internal teeth of the worm wheel.

Thereby, the transmission mechanism can operate in a satisfactory manner even when the viscosity of the lubricating oil should increase under a low temperature condition, and the fuel lid device can be designed as a highly compact unit.

According to yet another aspect of the present invention, the drive unit includes an actuator that is configured to reciprocate by a prescribed stroke, and the transmission mechanism includes a cam or a link.

Thereby, the number of component parts of the lid device can be reduced.

According to yet another aspect of the present invention, the lid device further includes a housing (24) accommodating the push lifter, the drive unit and the transmission mechanism.

Thereby, the lid device can be formed as an assembly that can be readily installed on the vehicle.

According to yet another aspect of the present invention, the housing includes a first retaining portion (86) retaining the push lifter and a second retaining portion (88) retaining the drive unit and the transmission mechanism, and separated from the first retaining portion by a partition wall (90).

Thereby, the second retaining portion may be placed in a water tight condition for the protection of the drive unit even when an air hole is provided in the first retaining portion for allowing an air flow created by the pushing operation of the push lifter. Furthermore, the first retaining portion and the second retaining portion may be independently designed so that a new function may added to either retaining portion without any difficulty.

The present invention further provides a fuel lid structure (2) comprising a fuel lid pivotally supported for opening and closing a filler opening of a vehicle body and a lid device with any of the features mentioned above and configured to lock the fuel lid in the closed position.

According to this arrangement, the lid device can be formed as a compact unit which can be installed on a vehicle with the fuel lid already attached thereto in an efficient manner.

Effect of the Invention

According to the present invention, the dimension of the lid device in the direction of the motion of the lock member can be reduced. Thereby, the lid device can be formed as a compact unit which can be efficiently installed.

BRIEF DESCRIPTION OF THE DRAWINGS

FIG. 6 is an exploded perspective view of a fuel lid device given as a second embodiment of the present invention;

DETAILED DESCRIPTION OF THE PREFERRED EMBODIMENT(S)

Figure 1:
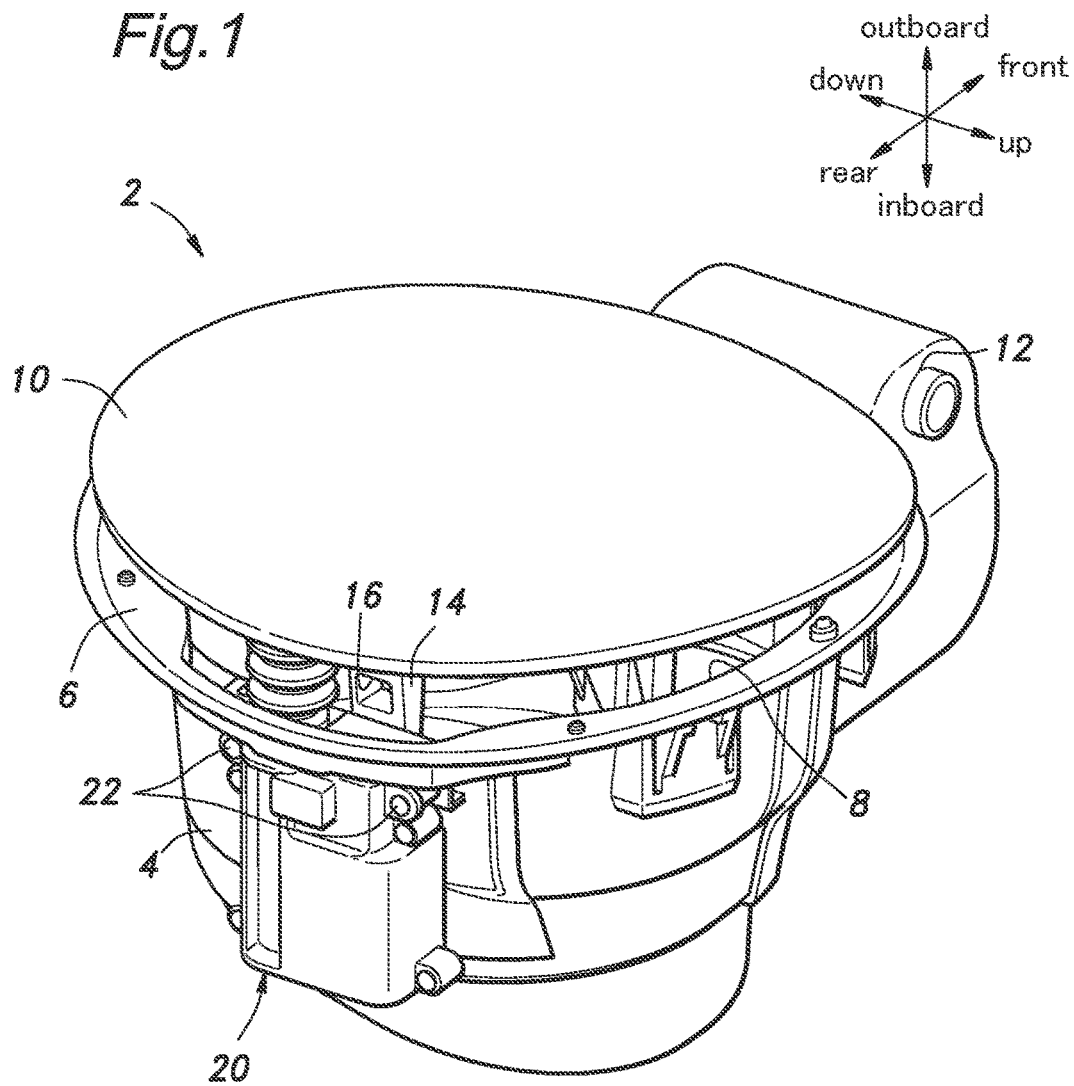
FIG. 1 is an exploded perspective view of a fuel lid assembly incorporated with a fuel lid device given as a first embodiment of the present invention.

The present invention is described in the following in terms of preferred embodiments with reference to the appended drawings. The directions used in the following description are based on the orientation of the device as mounted on a vehicle. FIG. 1 is a perspective view of a fuel lid assembly 2 which is installed on a rear end part of the left side of a vehicle not shown in the drawings. However, the fuel lid assembly 2 may also be installed on the rear end, the right side or any other part of the vehicle body.

A filler opening housing 4 defining the general outer profile of the fuel lid assembly 2 is provided with the shape of a cup with an opening defined in the bottom end thereof, and the outboard end thereof having a comparatively large outer diameter is provided with a radial flange 6. When the fuel lid assembly 2 is installed on the vehicle body, the fuel filler neck communicating with a fuel tank is passed into the fuel lid assembly 2, and the open end of the fuel filter neck is closed by a cap (not shown in the drawings). A fuel lid 10 is a disk member made of metallic or plastic material, and is connected to the filler opening housing 4 via a hinge 12 so that the fuel lid 10 is enabled to open and close a fuel filler opening 8 defined on the outboard end of the filler opening housing 4. The fuel lid 10 may also be provided with a rectangular or any other planar configuration, instead of being disk-shaped. The hinge 12 is provided on the front end side of the filler opening housing 4, and is provided with a vertically extending hinge axis. The fuel lid 10 closes and opens the fuel filler opening 8 by pivoting about the hinge axial line. When the fuel lid 10 closes the fuel filler opening 8, the outer surface of the fuel lid 10 continuously conforms to the outer profile of the vehicle body. The back side of the fuel lid 10 is provided with an inner lid (not shown in the drawings) which includes an engagement piece 14 projecting from a free end part of the back side of the fuel lid 10 (remote from the base end part thereof connected to the hinge 12). An engagement hole 16 is passed through the engagement piece 14 in the fore and aft direction in the closed state of the fuel lid 10. A fuel lid device 20 provided with a lock member 18 (FIG. 2) for engaging the engagement piece 14 by being passed into the engagement hole 16 is attached to an outer surface of the filler opening housing 4 by using screws.

Figure 2:
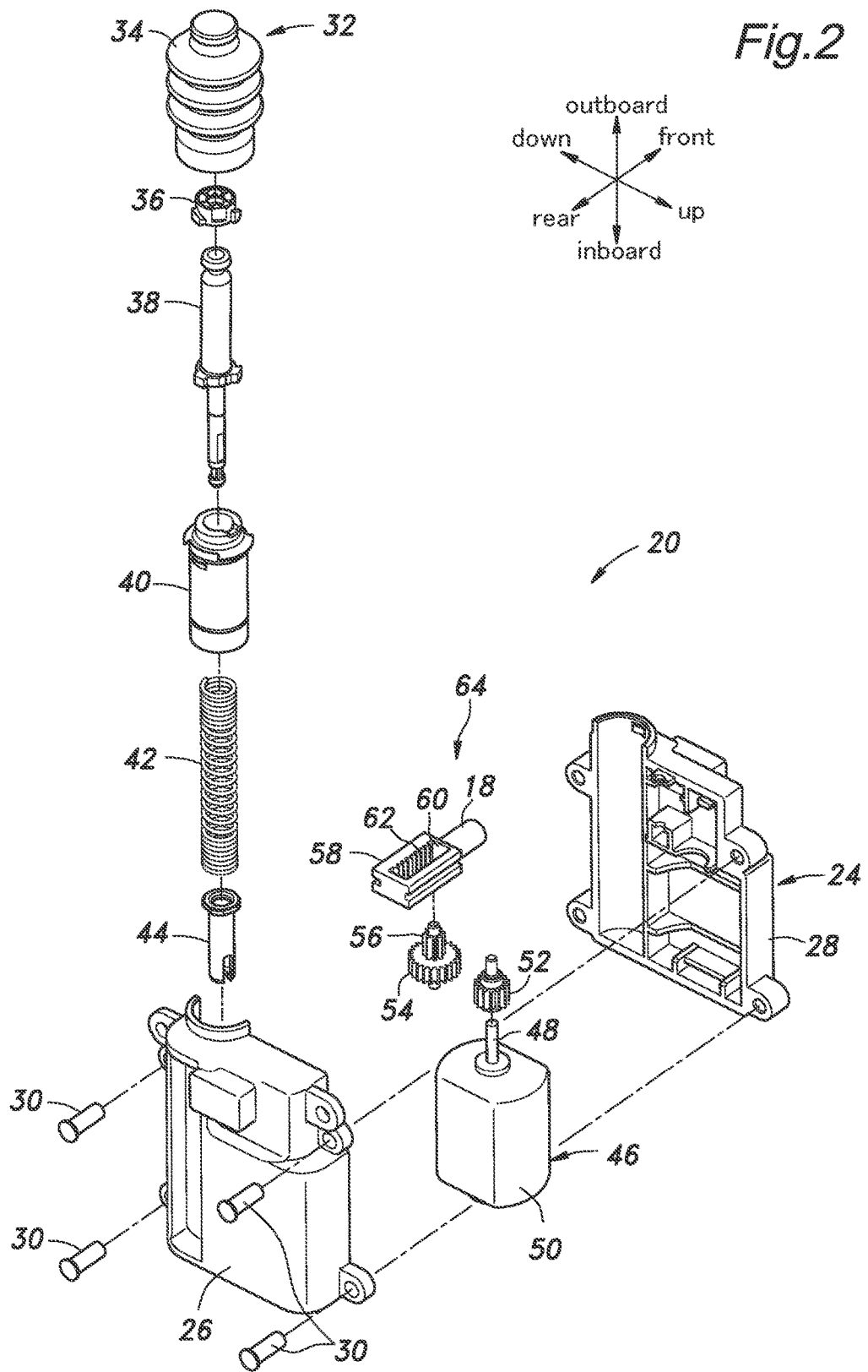
FIG. 2 is an exploded perspective view of the fuel lid device of the first embodiment.
Figure 3:
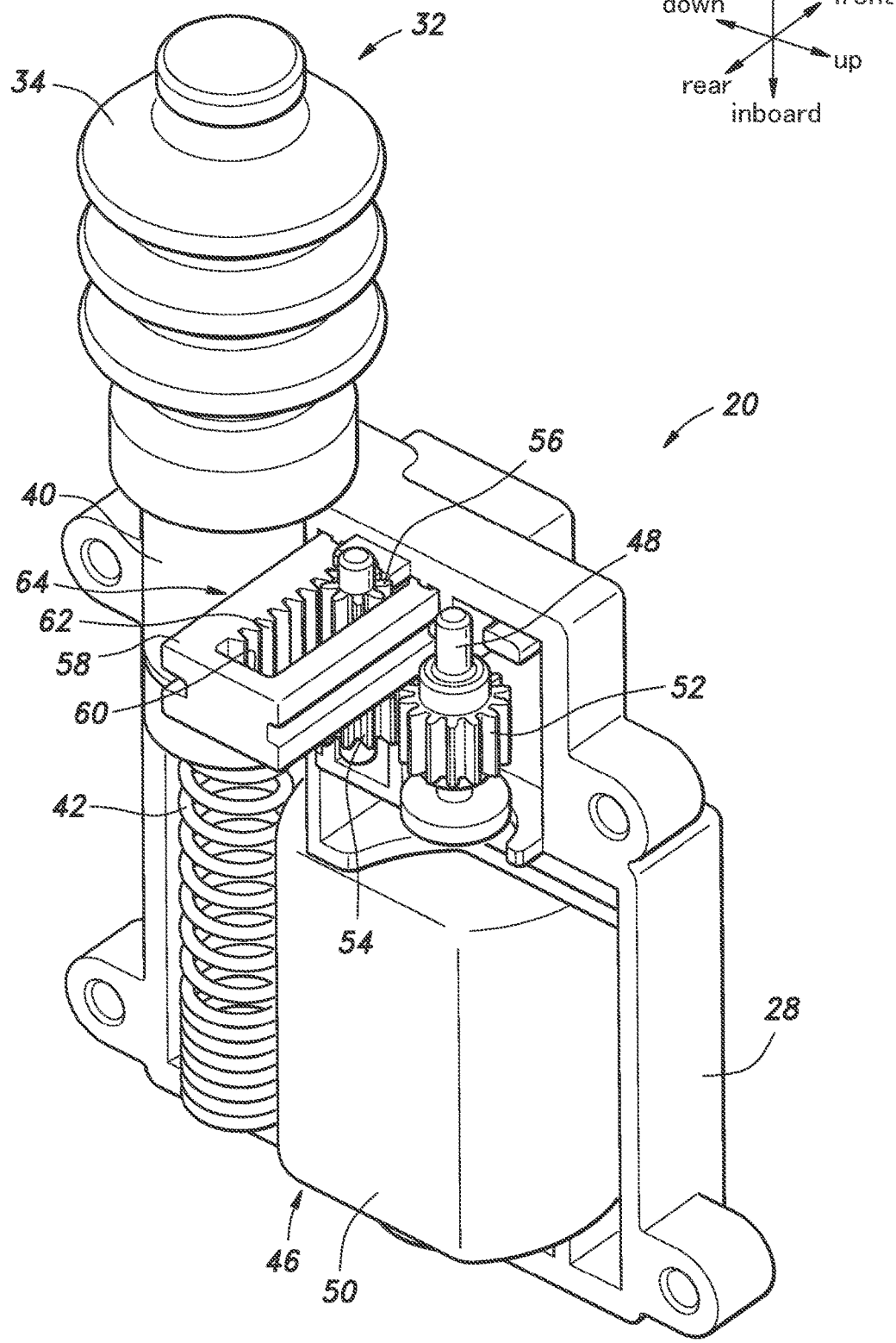
FIG. 3 is a perspective view of the fuel lid device of the first embodiment with a part of the housing omitted from illustration.
Figure 4:
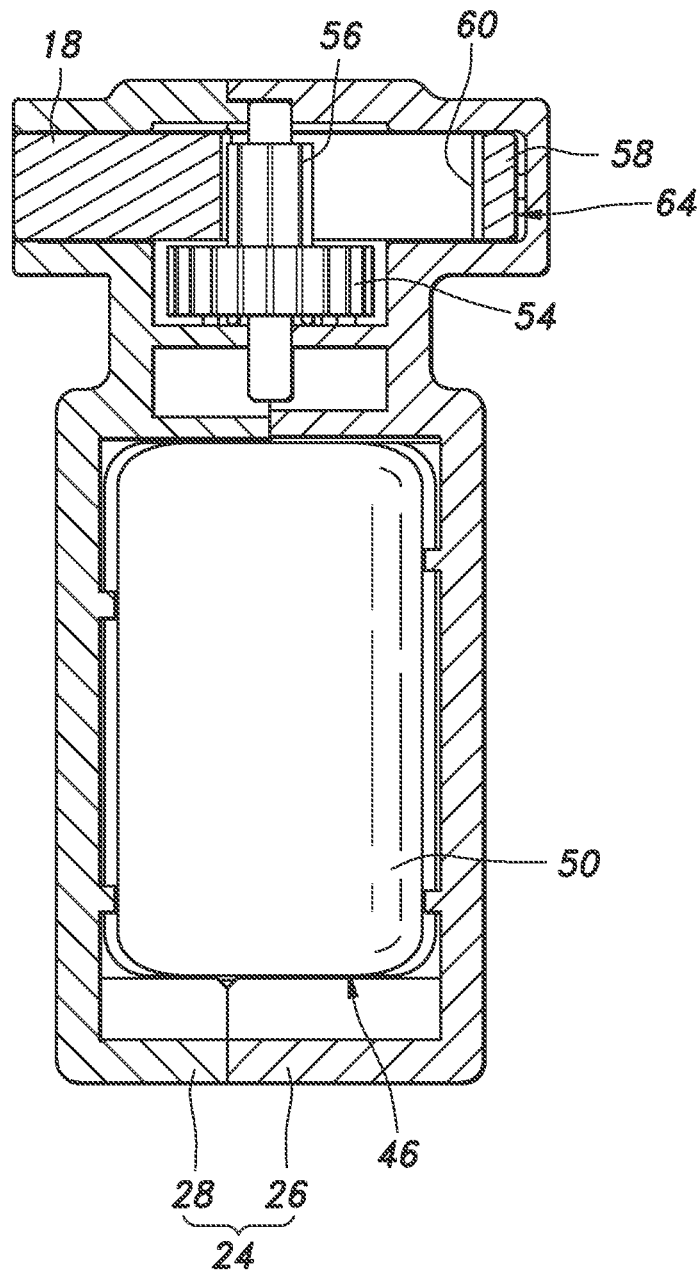
FIG. 4 is a sectional view showing an unlocked condition of the fuel lid device of the first embodiment.
Figure 5:
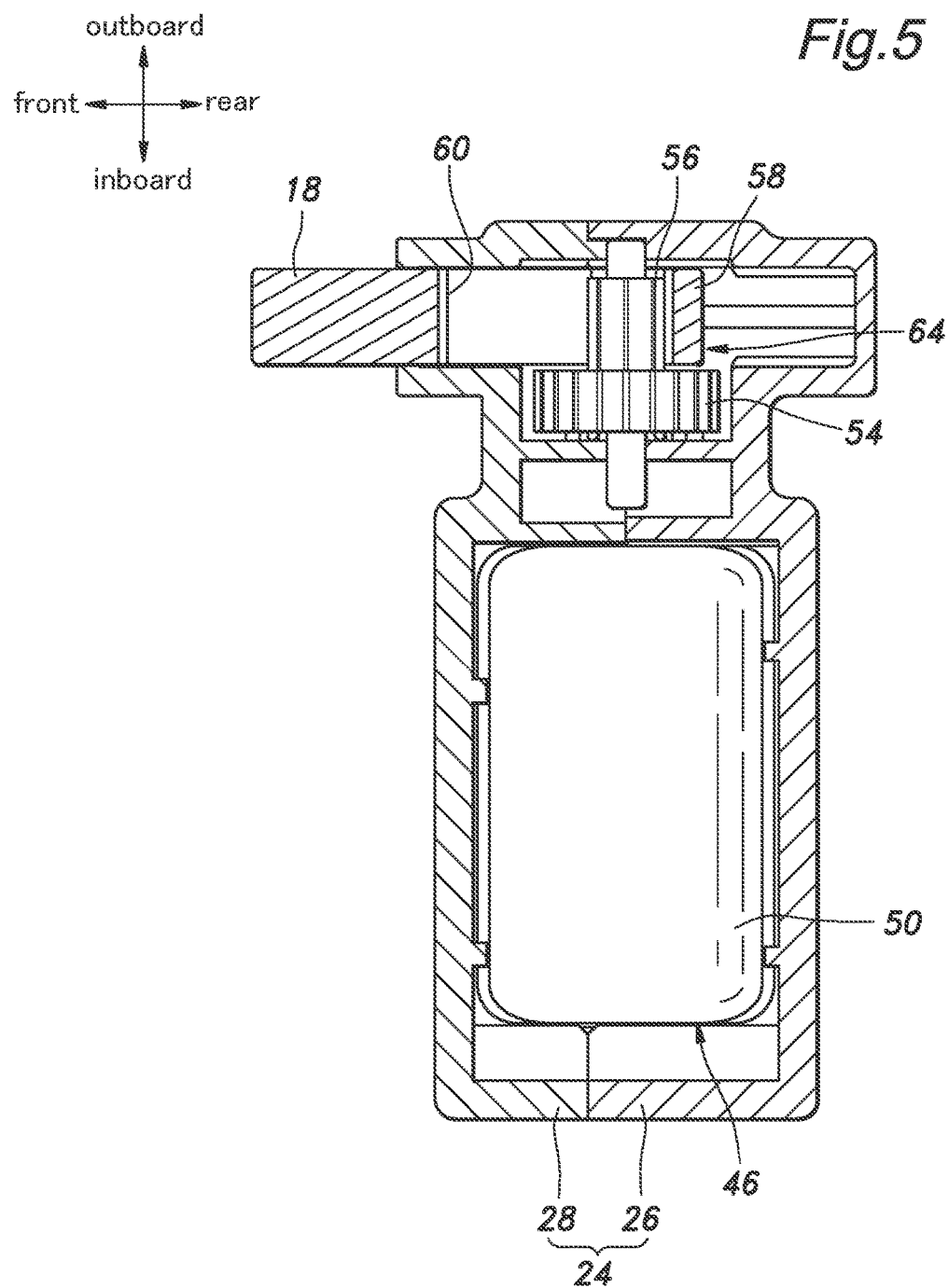
FIG. 5 is a sectional view showing a locked condition of the fuel lid device of the first embodiment.

FIG. 2 is an exploded perspective view of the fuel lid device 20, and FIG. 3 is a perspective view of the fuel lid device 20 with a rear case 26 of a housing 24 omitted from illustration. FIGS. 4 and 5 are sectional views taken along a plane extending in the lateral and fore and aft direction and passing through the lock member 18, in the unlocked state and the locked state, respectively. The fuel lid device 20 is provided with the function to open and close the fuel lid 10 and the function to releasably lock the fuel lid 10 in the closed position.

The fuel lid device 20 is provided with a box-shaped housing 24 made of molded plastic material for accommodating the main components of the fuel lid device 20, and formed by combing a rear case 26 and a front case 28. The rear case 26 is connected to the front case 28 by using screws. The housing 24 is fixedly attached to the outer surface of the filler opening housing 4. The housing 24 or the front case 28 may be partly or entirely integrally molded with the filler opening housing 4. If desired, the outboard side of the housing 24 may consist of an open side which is closed by a flange 6 or the like when attached to the filler opening housing 4.

A push lifter 32 consisting of a rod shaped assembly and received in the housing 24 for opening the fuel lid 10 includes a push button 34, a cam 36, a rod 38, an outer sleeve 40, a spring 42 and an inner sleeve 44. Each time the push button 34 is pressed, the push lifter 32 alternates between an extended state and a retracted state. In the retracted state, the push lifter 32 does not interfere with the fuel lid 10 in the closed position, and permits the fuel lid 10 to be maintained in the closed position. In the extended state, the push lifter 32 supports the fuel lid 10 in a slightly open state. The base end of the push lifter 32 or the inboard end of the spring 42 abuts the housing 24, and the outer sleeve 40 is fixedly secured to the housing 24. The push button 34 is provided with a resiliency in the lengthwise direction or in the lateral direction of the vehicle body. The inboard end of the push button 34 is fixedly attached to the outboard end of the housing 24, and the outboard end of the push button 34 is passed through an opening provided in the flange 6 without regard to the state of the push lifter 32 (the extended state or the retracted state) so that the push button 34 may engage the fuel lid 10 at all times. The fuel lid 10 is slightly spaced from the flange 6 so that the push button 34 of the push lifter 32 may be pushed in the inboard direction even when the fuel lid 10 is in the closed position. The push lifter 32 is provided with a per se known structure, and any conventionally known push lifter may be used for the present invention.

The structure for releasably locking the fuel lid 10 in the closed position is described in the following.

An electric motor 46 serving as a drive unit for driving the lock member 18 is placed in the housing 24 such that a motor shaft 48 thereof extends in parallel with the lengthwise direction of the push lifter 32. The lengthwise direction of the motor 46 is defined as the axial direction of the motor shaft 48, and the length of the motor 46 is smaller than the length of the push lifter 32 in the extended state. An outboard end of the motor shaft 48 is exposed from a motor housing 50. The motor housing 50 is fixedly secured to the housing 24 such that the bottom surface of the inboard end of the motor housing 50 is located at a substantially same height as the base end of the push lifter 32. The cross section of the motor housing 50, which is perpendicular to the motor shaft 48, is provided with an elongated shape whose long side is in parallel with the vertical direction of the vehicle body.

The motor shaft 48 is coaxially fitted with a drive gear 52 consisting of a spur gear made of metallic or plastic material. A driven gear 54 meshing with the drive gear 52 is provided between the motor shaft 48 and the push lifter 32. The driven gear 54 consists of a spur gear made of plastic material such as POM or metallic material, and has a larger diameter and a larger number of teeth than the drive gear 52. A pinion 56 is fixedly attached to the outboard side of the driven gear 54 in a coaxial relationship. The pinion 56 has a smaller diameter and a smaller number of teeth than the driven gear 54. The pinion 56 may be made of plastic material such as POM or metallic material, and may be integrally formed with the driven gear 54. The driven gear 54 and the pinion 56 are rotatably supported by the housing 24. The drive gear 52, the driven gear 54 and the pinion 56 jointly form a speed reduction spur gear group.

The pinion 56 meshes with a rack 58 consisting of a member elongated in the fore and aft direction, and provided with a slot 60 passed through the rack 58 in the lateral direction of the vehicle body and elongated in the fore and aft direction. Rack teeth 62 meshing with the pinion 56 are formed on an inner side wall of the slot 60 extending along the length of the slot 60. The rack 58 is made of plastic material such as POM or metallic material. The rack 58 is positioned on the outboard side of the motor 46, and above the push lifter 32, and is supported by the housing 24 so as to be slidable in the fore and aft direction. Because the pinion 56 is received in the slot 60, the range of the sliding movement of the rack 58 in the fore and aft direction is limited by the abutment of the pinion 56 onto the respective axial ends of the slot 60.

The lock member 18 consists of a rod member made of plastic material such as POM or metallic material, and projects forward from the front end of the rack 58. The lock member 18 may be integrally formed with the rack 58. The drive force of the motor 46 is transmitted to the lock member 18 via a transmission mechanism consisting of the drive gear 52, the driven gear 54, the pinion 56 and the rack 58 so that the lock member 18 moves forward or backward depending on the rotational direction of the motor 46. When the rack 58 has retreated, the lock member 18 is completely received within the housing 24. When the rack 58 has advanced, the lock member 18 projects from the housing 24, and the front end of the lock member 18 fits into the engagement hole 16 of the fuel lid 10 after passing through an opening provided in the filler opening housing 4.

The drive unit may consist of other actuators such as a solenoid that causes a reciprocating movement of a prescribed stroke, instead of the electric motor 46, and the transmission mechanism for the drive unit may use a cam mechanism or a link mechanism. Instead of the lock member 18 consisting of a rod member configured to undergo a linear movement, other lock means such as an arcuate member having an internal teeth meshing with the pinion 56 and an arcuate member that rotates around the rotational center line of a gear rotating at a reduced speed may also be used.

The opening and closing action of the fuel lid 10 and the operation of the lock mechanism are described in the following.

When the vehicle is in operation, the fuel lid 10 is closed, and the lock member 18 is passed into the engagement hole 16 as shown in FIG. 5. Because the lock member 18 is retained by the housing 24 via the rack 58, the fuel lid 10 is securely held stationary against any pivoting movement. Therefore, even when the fuel lid 10 is pulled or pushed, the fuel lid 10 is locked in the closed position owing to the engagement between the engagement hole 16 and the lock member 18. There may be some play in the engagement between the engagement hole 16 and the lock member 18 but should be small enough not to cause the change of the push lifter 32 from the retracted state to the extended state even when the fuel lid 10 is pushed in the inboard direction.

The motor 46 may be linked with switches, onboard systems and an electronic control unit (ECU) of the vehicle, in particular with a door lock system, so that when the vehicle has come to a stop and the door lock is released, the motor 46 is actuated, and the motor shaft 48 is turned. The drive force of the electric motor 46 is transmitted to the rack 58 at a reduced speed via the drive gear 52, the driven gear 54 and the pinion 56 so that the rack 58 as well as the lock member 18 fixed to the rack 58 retreats. This causes the lock member 18 to be disengaged from the engagement hole 16 of the fuel lid 10, and the retreating movement of the lock member 18 continues until the rear end of the rack 58 abuts the rear case 26 or until the pinion 56 abuts the front end of the slot 60 of the rack 58. At this time, the lock member 18 is fully received in the housing 24 in the released position or the unlocked position as shown in FIG. 4.

When the lock member 18 is in the released position, the lock member 18 is released from the engagement hole 16 formed in the inner lid of the fuel lid 10 so that the fuel lid 10 is freed from any restraint. The fuel lid 10 is biased by a magnetic force, a spring force or a latch mechanism so that the fuel lid 10 in the released position is held in the closed position until a force exceeding a prescribed level is applied to the fuel lid 10. At this time, if the user pushes the fuel lid 10 in the closed position in the inboard direction, the push button 34 is forced in the inboard direction. This causes the push lifter 32 to be extended so that the fuel lid 10 is pushed out in the outboard direction. As a result, the fuel lid 10 is pushed out by the push button 34 to an open ready position in which the fuel lid 10 is slightly opened so as to project slightly from the outer profile of the vehicle body. In this open ready position, the fuel lid 10 projects only to an extent necessary for the user to be able to get a hold on the free end of the fuel lid 10. The user is then enabled to manually open the fuel lid 10 to the fully open position which may be at an angle of more than 90 degrees from the fully closed position. The fully opened fuel lid 10 is maintained in this position by the magnetic force, the spring force or the latch mechanism until a force exceeding a prescribed level is applied thereto. When the fuel lid 10 is fully open, the user can refuel the vehicle by removing the fuel cap from the filler opening.

When the refueling is completed, the user puts the fuel cap back on the filler opening, and pushes the fuel lid 10 back in the inboard direction beyond the open ready position. This causes the push button 34 to be pushed in the inboard direction by the fuel lid 10, and the push lifter 32 to be put into the retracted condition. As a result, the fuel lid 10 is brought into the fully closed position.

When the vehicle doors are locked thereafter, the motor 46 is actuated as a result to cause a reverse rotation of the motor shaft 48 such that the rack 58 advances forward until the front end of the rack 58 abuts the front case 28 or until the pinion 56 abuts the rear end of the slot 60 of the rack 58. As a result, the lock member 18 projects from the housing 24, and moves to the engage position or moves into the engagement hole 16 to lock the fuel lid 10 in the closed position.

In this fuel lid device 20, because the lengthwise direction of the push lifter 32 and the lengthwise direction of the motor 46 or the axial direction of the motor shaft are parallel to each other, the fore and aft dimension and the vertical dimension of the fuel lid device 20 can be minimized. The arrangement for actuating the lock member 18 consists of a highly compact unit formed by the speed reduction spur gear group consisting of the drive gear 52, the driven gear 54 and the pinion 56, and the rack 58 meshing with the pinion 56. Therefore, the arrangement for actuating the lock member 18 does not prevent the fuel lid device 20 to be designed as a highly compact unit. In the illustrated embodiment, the fuel lid device 20 is reduced in size to such an extent that the fuel lid 10 and the fuel lid device 20 may be installed on a vehicle as an integrally combined assembly or as a fuel lid assembly 2. Thereby, the efficiency of the assembly work is improved, and the manufacturing cost can be reduced. Also, the fuel lid device 20 requires a less amount of work for installing on a vehicle, and a smaller number of component parts as compared with the wire controlled fuel lid device.

Figure 7A:
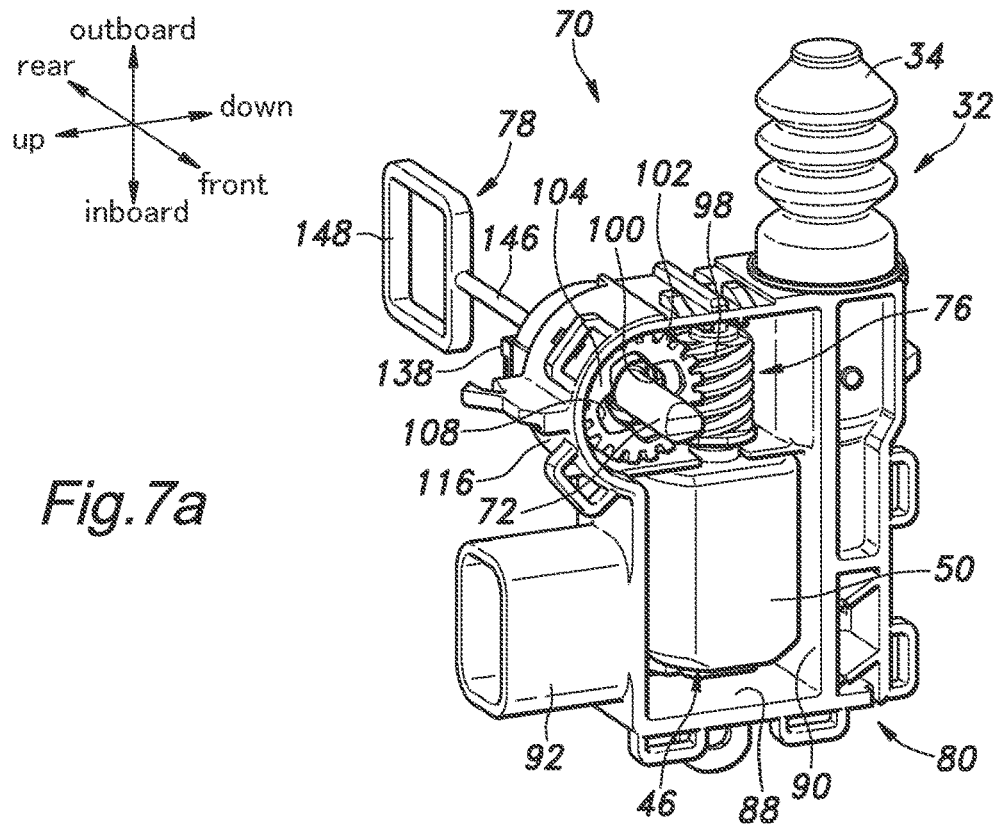
FIG. 7a is a perspective view of the fuel lid device of the second embodiment in an unlocked condition with a part of the device omitted from illustration.
Figure 7B:
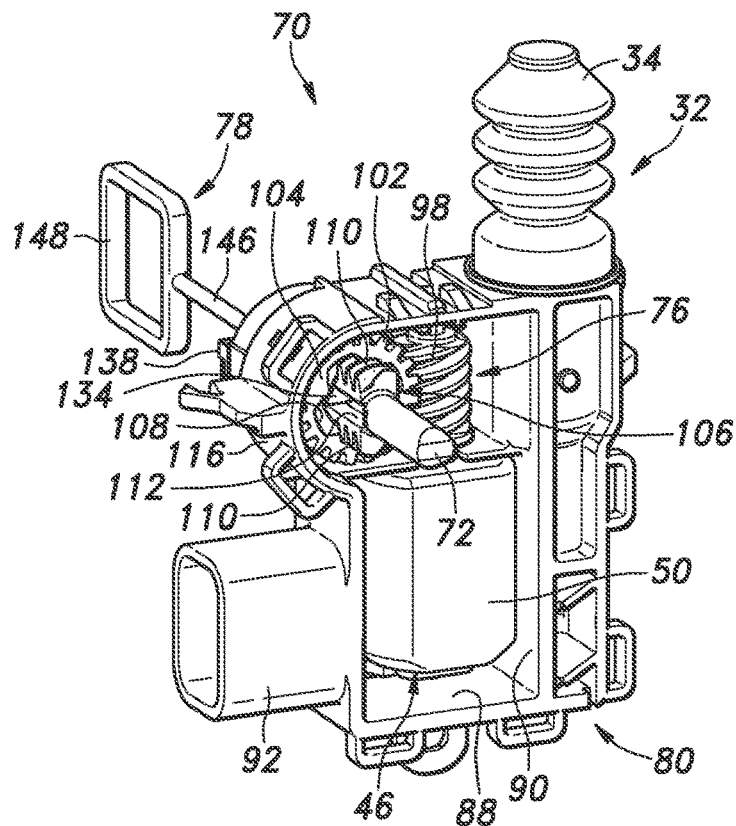
FIG. 7b is a perspective view of the fuel lid device of the second embodiment in a locked condition with a part of the device omitted from illustration.
Figure 8A:
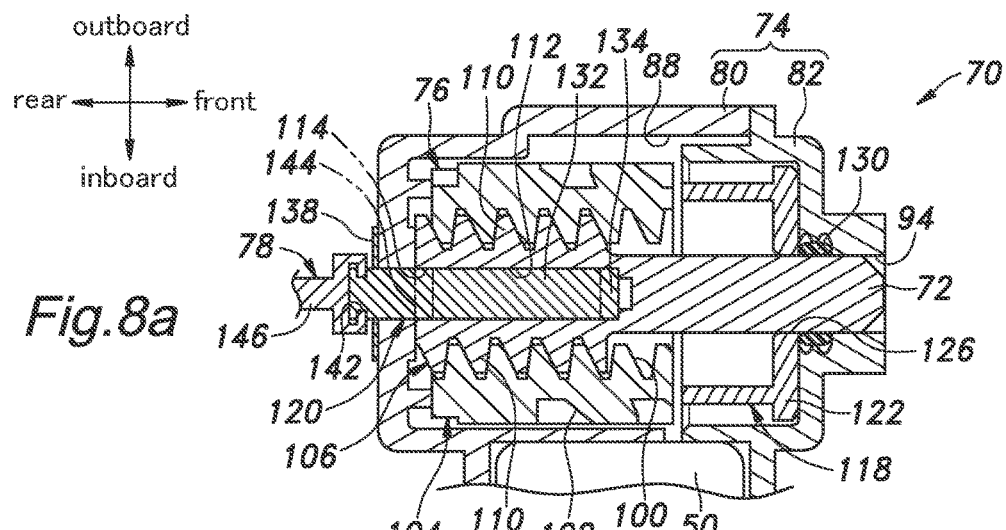
FIG. 8a is a sectional view of the fuel lid device of the second embodiment in an unlocked condition.
Figure 8B:
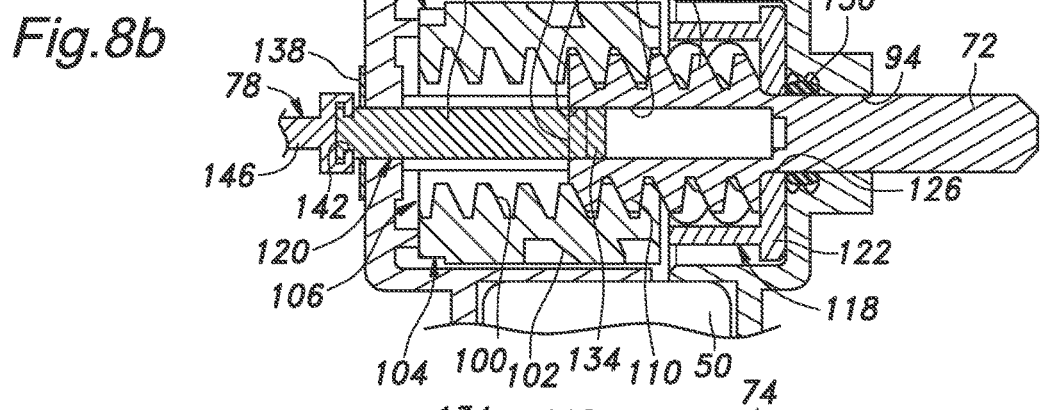
FIG. 8b is a sectional view of the fuel lid device of the second embodiment in a locked condition.
Figure 8C:
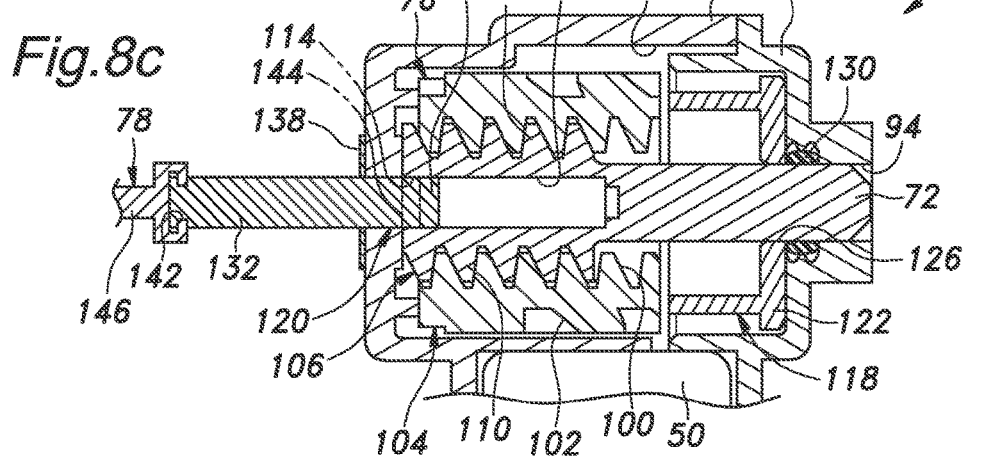
FIG. 8c is a sectional view of the fuel lid device of the second embodiment in a manually unlocked condition.

The second embodiment of the present invention is described in the following with reference to FIGS. 6 to 8. In the following description, the parts corresponding to those of the first embodiment are denoted with like numerals without necessarily repeating the description of such parts. FIG. 6 is an exploded perspective view of the fuel lid device 70. FIG. 7a is a perspective view of the fuel lid device 70 in an unlocked condition with a front part (a viewer side part) of the device omitted from illustration, and FIG. 7b is a perspective view of the fuel lid device 70 in a locked condition with a front part (a viewer side part) of the device omitted from illustration. FIG. 8a is a sectional view of the fuel lid device 70 taken along a plane in parallel with the fore and aft direction and the lateral direction of the vehicle body and passing through the axial line of the lock member 72 when the lock member 72 is in an unlocked condition, FIG. 8b is a similar sectional view of the fuel lid device 70 when the lock member 72 is in a locked condition, and FIG. 8c is a similar sectional view of the fuel lid device 70 when the lock member 72 is in a manually unlocked condition.

Similarly as the first embodiment, the fuel lid device 70 is fixedly attached to the outer surface of the filler opening housing 4 so that the lock member 72 may fit into the engagement hole 16 of the fuel lid 10 to engage the engagement piece 14. See FIG. 1. The fuel lid device 70 includes a housing 74, a push lifter 32, an electric motor 46 serving as a drive unit, a transmission mechanism 76 for transmitting the drive force of the electric motor 46 to the lock member 72, and a release lever 78 for manually moving the lock member 72 from the engage position to the release position.

The housing 74 accommodating a most part of the major components of the fuel lid device 70 is made of a molded plastic member including a box shaped main body 80 having an open front end and a lid 82 covering the open front end of the main body 80. The main body 80 and the lid 82 are provided with mutually cooperating engagement features 84 so that the main body 80 and the lid 82 may be attached to each other by engaging the corresponding engagement features 84. The housing 74 is provided with a first retaining portion 86 for retaining the push lifter 32 and a second retaining portion 88 for retaining the motor 46 and the transmission mechanism 76. The first retaining portion 86 and the second retaining portion 88 are separated from each other by a partition wall 90 formed in the main body 80. The push lifter 32 is retained by the first retaining portion 86 such that the push button 34 projects from an opening provided on the outboard side of the housing 74. The first retaining portion 86 may be provided with an air hole communicating with the exterior for permitting the flow of air caused by the pushing operation of the push button 34. A dust seal may be provided between the opening provided on the outboard side of the housing 74 and the push button 34. The second retaining portion 88 for retaining the motor 46 may be provided with a moisture seal interposed between the main body 80 and the lid 82. Because the first retaining portion 86 and the second retaining portion 88 are separated from each other by the partition wall 90, the first retaining portion 86 may be provided with the air hole while the second retaining portion 88 is sealed in a water tight manner at the same time. Furthermore, because the first retaining portion 86 and the second retaining portion 88 are separated from each other by the partition wall 90, the two portions may be designed independently from each other so that new features may be added to the device without difficulty. For instance, the push lifter 32 is provided with a spring 42, and the structure for preventing the push lifter 32 from popping out of the housing 74 may be provided in the first retaining portion 86 without affecting the second retaining portion 88 in any way. The upper side of the main body 80 is provided with a connector portion 92 to establishing an electric connection with a power source (not shown in the drawings). The lid 82 is provided with a through hole 94 for receiving the lock member 72 therein in a slidable manner. The fuel lid device 70 is mounted on the filler opening housing 4 with the side of the lid 82 facing the filler opening housing 4 so that the through hole 94 and the engagement hole 16 of the fuel lid 10 may align with each other.

The structures and the functions of the push lifter 32 and the motor 46 are similar to those of the first embodiment, and the push lifter 32 and the motor 46 are arranged in the housing 74 such that the motor shaft 48 is in parallel with the lateral direction of the vehicle body or the lengthwise direction of the push lifter 32. The motor 46 is electrically connected to the connector portion 92 via a connecting piece 96 inserted into the connector portion 92, and to the power source via the connector portion 92.

The transmission mechanism 76 transmits the drive force of the motor 46 to the lock member 72 such that the rotation of the motor shaft 48 is converted into the linear reciprocating motion of the lock member 72. The transmission mechanism 76 includes a worm 98 coaxially attached to the motor shaft 48 of the motor, a worm wheel 104 provided with internal teeth (internal screw thread) 100 and external teeth 102 meshing with the worm 98, and a rack 106 fixedly attached to the lock member 72 and configured to reciprocate in the fore and aft direction by meshing with the internal teeth 100 of the worm wheel 104.

The worm 98 is made of metallic or plastic material, and meshes with the external teeth 102 of the worm wheel 104. The worm wheel 104 made of metallic or plastic material is formed with a through hole 108 extending in the direction of the rotational axis thereof and the internal teeth 100 on the inner periphery thereof. The worm 98 transmits the rotation of the motor shaft 48 to the worm wheel 104 at a reduced speed, and converts the rotation around the axis extending in the lateral direction into the rotation around the axis extending in the fore and aft direction.

The rack 106 is made of metallic or plastic material, and is provided with rack teeth (external screw thread) 110 meshing with the internal teeth 100 of the worm wheel 104. The rack 106 is essentially made of a rod member having a generally rectangular cross section, and the rack teeth 110 is formed on the two sides thereof facing the inboard and outboard directions, respectively. The rack 106 is further provided with a groove 112 extending the fore and aft direction on the upper surface thereof and a through hole 114 passed from the lower surface thereof so as to communicate with the groove 112. The lock member 72 extends forward from the front end of the rack 106. The lock member 72 may be integrally formed with the rack 106. The rotational motion of the worm wheel 104 is thus converted into the linear motion of the rack 106 and the lock member 72.

The worm 98 has a larger diameter than the pinion 56 of the first embodiment, and actuates the worm wheel 104 with a greater torque value. Therefore, even when the viscosity of the lubricating oil should increase owing to a low temperature, the transmission mechanism 76 is able to operate properly. Therefore, the fuel lid device 70 of the second embodiment is suitable for use in cold regions. Also, because the rack 106 is positioned within the worm wheel 104, the fuel lid device 70 can be installed in a limited space. The housing 74 is provided with a bulge 116 projecting in the upward direction in an outboard end part of the housing 74 to accommodate the worm wheel 104, but because the connector portion 92 projects upward in a more inboard part of the housing 74, the housing 74 can be received in a rectangular space without creating any significant dead space. Thus, the fuel lid device 70 is reduced in size to such an extent that the fuel lid device 70 may be installed on a vehicle after being attached to the filler opening housing 4 as an integrally combined assembly. Thereby, the efficiency of the assembly work is improved.

The lock member 72 and the rack 106 which may be integrally molded are retained by a first support member 118 and a second support member 120 mounted on the housing 74 so as to be slidable in the fore and aft direction. The worm wheel 104 is supported by being threaded onto the rack 196.

The first support member 118 includes a disk-shaped base portion 122 attached to the back side of the lid 82 of the housing 74 and a pair of leg portions 124 extending rearward from the base portion 122. The base portion 122 is centrally formed with a through hole 126 aligning with the through hole 94 of the lid 82 for slidably receiving the lock member 72. A pair of notches 128 are formed on the periphery of the disk-shaped base portion 122 for preventing the rotation of the first support member 118 around the axial line directed in the fore and aft direction by engaging corresponding features provided on the back side of the lid 82. Each leg portion 124 consists of a rectangular plate member. The leg portions 124 vertically oppose each other from either side of the through hole 126, and engage the upper and lower surfaces of the rack 106 at the free end parts thereof, respectively. Thus, the rack 106 is interposed between the free end parts of the leg portions 124 such that the rack 106 is prevented from rotating when the worm wheel 104 rotates. An O ring 130 is interposed between the base portion 122 and the lid 82 to slidably receive the lock member 72 while ensuring the water tightness of the second retaining portion 88.

The second support member 120 includes a columnar portion 132 extending in the fore and aft direction and a plate-shaped stopper 134 extending upward from the free end of the columnar portion 132. The columnar portion 132 is fitted into a through hole (not shown in the drawings) formed in the rear wall (bottom wall) of the main body 80 of the housing 74, and is normally held stationary even when the motor 46 is actuated. This through hole is disposed coaxial to the through hole 94 of the lid 82. The rear end side of the columnar portion 132 is fitted into an O ring 136 provided on the exterior of the housing 74 to ensure the water tightness of the second retaining portion 88. The O ring 136 is fixedly attached to the housing 74 by being interposed between the housing 74 and a cover 138 which is made of rectangular strip of sheet metal and is fixedly attached to the housing 74. The rear end part of the columnar portion 132 extending rearward beyond the cover 138 is provided with a circumferential groove 142. The columnar portion 132 is supported by the rack 106 by being passed through the through hole 114 of the rack 106, and being slidably engaged by the groove 112 of the rack 106 at the free end thereof. A stopper 134 restricts the forward movement of the rack 106 and the lock member 72 relative to the columnar portion 132 by engaging the front surface of a part of a rear wall 144 of the rack 106 defining the through hole 114 when the lock member 72 is in the engage position (See FIG. 8b). When the lock member 72 is in the release position, the rearward movement of the rack 106 and the lock member 72 is restricted by the engagement of the stopper 134 by the front end surface of the groove 112 of the rack 106, or by the engagement between the bottom wall (rear wall) of the main body 80 of the housing 74 and the rear surface of the rear wall of the rack 106 (See FIG. 8a). Therefore, the lock member 72 is enabled to move between the engage position and the release position by being actuated by the motor 46.

The release lever 78 may be used for manually moving the lock member 72 from the engage position to the release position in an emergency situation such as when the lock member 72 cannot be moved from the engage position to the release position owing to a failure of the motor 46 or a wire disconnection. The rack 106, the worm wheel 104 and the worm 98 are configured to be moved in reverse by applying an external force to the rack 106 by selecting the lead angle of the gear teeth to be greater than the friction angle. The release lever 78 is made of a molded plastic member, and includes a lanyard 146 extending in the fore and aft direction and an annular grip 148 formed in the rear end of the lanyard 146. The front end of the lanyard 146 is fixedly attached to the second support member 120 by being engaged by the groove 142 of the second support member 120. The annular grip 148 is dimensioned so as to be held by the finger of a user.

When the user pulls the release lever 78 rearward, the second support member 120 moves rearward. Because the stopper 134 of the second support member engages the rear wall 144 of the rack 106, the rack 106 is caused to move rearward while the worm wheel 104 and the worm 98 are caused to rotate. As a result, the lock member 72 eventually moves from the engage position where the lock member 72 is passed into the engagement hole 16 of the fuel lid to the release position where the fuel lid 10 unlocked.

The present invention has been described in terms of specific embodiments, but is not limited by such embodiments, and can be modified and substituted in various ways without departing from the spirit of the present invention. The part of the housing 24 which slidably receives the rack 58 in the first embodiment may be formed by soft material by using a two-color injection molding process so that a sealing performance may be achieved. If the motor 46 used in the first embodiment is a high torque and low rpm type, the speed reduction gear group may be omitted. In the second embodiment the first retaining portion and the second retaining portion may consist of two separate housings that can be joined to each other. The fuel lid device of the illustrated embodiments may also be used as a lid device for locking a lid other than a fuel lid.

GLOSSARY OF TERMS 2 fuel lid assembly
4 filler opening housing
6 flange
8 fuel filler opening
10 fuel lid
12 hinge
14 engagement piece
16 engagement hole
18, 72 lock member
20, 70 fuel lid device
24, 74 housing
32 push lifter
46 motor
48 motor shaft
50 motor housing
52 drive gear
54 driven gear
56 pinion
58, 106 rack
60, 62, 110 rack teeth
64, 76 transmission mechanism
86 first retaining portion
88 second retaining portion
90 partition wall
98 worm
100 internal teeth
102 external teeth
104 worm wheel

The invention claimed is:

1. A lid device for pushing out a hinged lid from a closed position to an open ready position, and for releasably locking the lid in the closed position, comprising:
   a push lifter that alternates between an extended state for pushing the lid to the open ready position and a retracted state for permitting the lid to be placed in the closed position each time a free end of the push lifter is pushed by the lid;
   a drive unit positioned near the push lifter;
   a lock member moveable between an engage position for engaging the lid in the closed position and a release position for releasing the lid; and
   a transmission mechanism for transmitting a drive force of the drive unit to the lock member to move the lock member between the engage position and the release position;
   wherein the lock member and the transmission mechanism are positioned between the push lifter and a side profile of the drive unit remote from the push lifter, and
   wherein the lock member is moveable in a direction substantially perpendicular to a lengthwise direction of the push lifter and a direction from the push lifter toward the drive unit.

2. The lid device according to claim 1, wherein the drive unit includes an electric motor having a motor shaft extending in the lengthwise direction of the drive unit, and the transmission mechanism includes a pinion driven by the electric motor and a rack fixedly attached to the lock member and configured to reciprocate in a direction perpendicular to the lengthwise direction of the push lifter by meshing with the pinion.

3. The lid device according to claim 1, wherein the drive unit includes an electric motor having a motor shaft extending in the lengthwise direction of the drive unit, and the transmission mechanism includes a worm coaxially attached to the motor shaft, a worm wheel having internal teeth and external teeth meshing with the pinion and a rack fixedly attached to the lock member and configured to reciprocate in a direction perpendicular to the lengthwise direction of the push lifter by meshing with the internal teeth of the worm wheel.

* * * * *